United States Patent [19]

Walker

[11] Patent Number: 4,635,482
[45] Date of Patent: Jan. 13, 1987

[54] SAGNAC PHASE DETECTION PASSIVE LASER ACCELEROMETER

[76] Inventor: Clifford G. Walker, 915 Weatherly Rd., Huntsville, Ala. 35803

[21] Appl. No.: 762,233

[22] Filed: Aug. 5, 1985

[51] Int. Cl.$^4$ .............................................. G01P 15/08
[52] U.S. Cl. .................................. 73/517 R; 356/349
[58] Field of Search ................. 73/517 R, 516 R, 657; 356/349, 350, 351; 250/227

[56] References Cited

U.S. PATENT DOCUMENTS

| | | | |
|---|---|---|---|
| 4,039,260 | 8/1977 | Redman | 356/106 L R |
| 4,155,251 | 5/1979 | Lautzenhiser | 73/517 R |
| 4,299,490 | 11/1981 | Cahill et al. | 356/350 |
| 4,428,234 | 1/1984 | Walker | 73/517 R |
| 4,429,573 | 2/1984 | Walker | 73/510 |
| 4,436,422 | 3/1984 | Schiffner | 356/349 |
| 4,454,418 | 6/1984 | Walker | 250/227 |
| 4,466,295 | 8/1984 | Wesson | 73/517 R |

OTHER PUBLICATIONS

W. C. Goss et al, "Fiber-Optic Rotation Sensor Technology", *Applied Optics*, vol. 19, No. 6, 15 Mar. 1980, pp. 852–858.
W. P. Risk et al, "Single-Sideband Frequency Shifting in Birefringent Optical Fiber", SPIE, vol. 478, *Fiber Optic and Laser Sensors II*, May 1–2, 1984, pp. 91–97.
F. Zarinetchi et al, "Passive Resonator Gyro", SPIE, vol. 478, *Fiber Optic and Laser Sensors II*, May 1–2, 1984, pp. 122–126.
R. F. Cahill et al, "Phase-Nulling Fiber-Optic Laser Gyro", *Optics Letters*, vol. 4, No. 3, Mar. 1979, pp. 93–95.
G. Schiffner et al, "Fiberoptic Rotation Sensor; Analysis of Effects Limiting Sensitivity and Accuracy", from *Fiber-Optic Rotation Sensors and Related Technologies*, Proceedings of the First International Conference, MIT, Cambridge, Mass., USA, Nov. 9–11, 1981; Editors S. Ezekiel and H. J. Arditty, Springer-Verlag Berlin Heidelberg, New York, 1982, pp. 266–268.

*Primary Examiner*—Stephen A. Kreitman
*Assistant Examiner*—John E. Chapman, Jr.
*Attorney, Agent, or Firm*—John C. Garvin, Jr.; Freddie M. Bush

[57] ABSTRACT

In a Sagnac-type of laser accelerometer, a common waveguide transducing element has oppositely rotating optical beams therein which are subsequently combined in a detection circuit to provide an output indicative of acceleration perpendicular to the plane of the transducing element. The counter rotating beams are ninety degrees polarized while passing through the transducer, so that only one beam is affected by the stress forces. The beams are shifted to the same polarization before interference fringes are developed on the detector.

12 Claims, 4 Drawing Figures

SAGNAC PHASE DETECTION PASSIVE LASER ACCELEROMETER

DEDICATORY CLAUSE

The invention described herein may be manufactured, used, and licensed by or for the Government for governmental purposes without the payment to me of any royalties thereon.

SUMMARY OF THE INVENTION

A laser accelerometer utilizes a common waveguide transducing element and counter-rotating optical beams of equal strength to develop an interference pattern between the beams in an output detection circuit. The developed interference pattern is indicative of the intensity and direction of acceleration forces applied to the transducer in a plane normal to the plane of the transducing element through which the beams are directed. The beams passing through the transducing element are polarized so that only one beam is affected by acceleration forces. A proof mass attached to the transducing element stresses the element in response to acceleration.

DESCRIPTION OF THE PREFERRED EMBODIMENT

Figure 1:
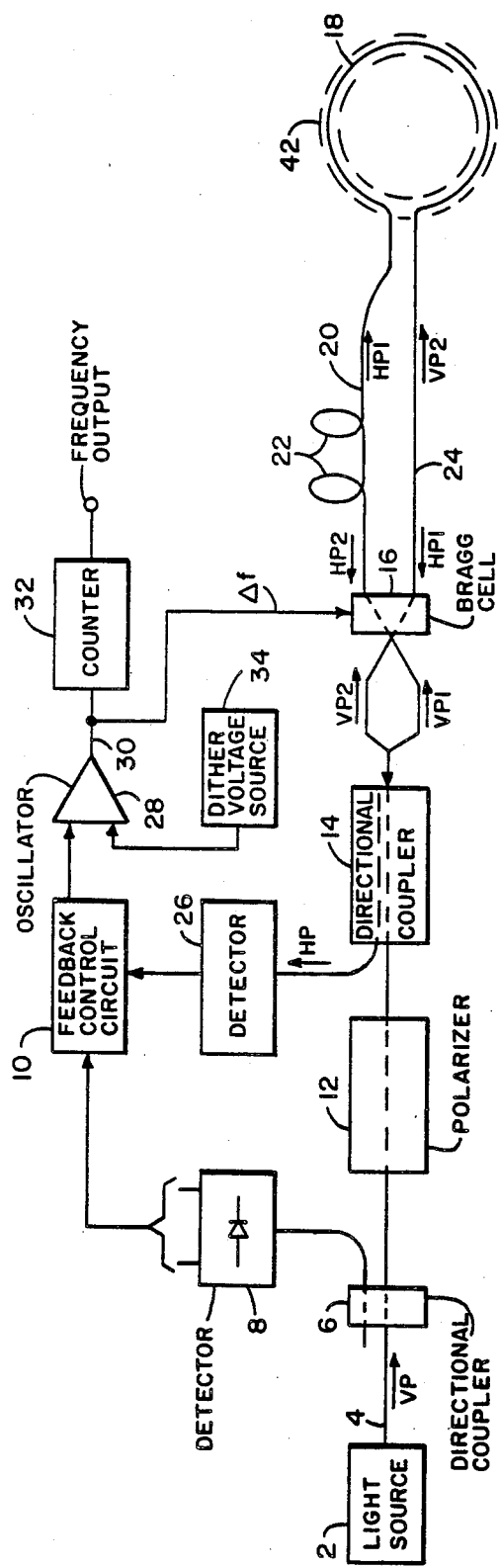
FIG. 1 is a diagrammatic schematic of a preferred embodiment of the Sagnac phase detection passive laser accelerometer using fiber optic waveguides and discrete components.

Referring now to the drawings, FIG. 1 shows an optical and electronic accelerometer circuit wherein a continuous strand fiber optic waveguide is the transducing element. A light source 2, which may be a laser diode, produces a beam 4 that is polarized by conventional means (not shown). Typically, and for purposes of explanation, the beam may be vertically polarized (VP). The beam 4 is weakly split by a waveguide-to-waveguide directional beamsplitter 6. A small part of the split beam is monitored by a photo detector 8 whose output is electrically coupled to electronic feedback system 10 to normalize the amplitude of a subsequent output signal. Most of the light from beamsplitter 6 is directed through a vertical polarizer 12 which ensures a high degree of vertical polarization and effectively blocks all horizontal beam components that may be traveling towards the light source, reducing noise in the system. The remainder of the VP beam is 50—50 split by another directional coupler 14, creating two vertically polarized beams of equal amplitude, VP1 and VP2. The signal beam (VP1) and reference beam (VP2) passes through an in-line fiber optics frequency shifter 16.

Frequency shifter 16 is an in-line Bragg cell and couples the two beams out of the cell in opposite directions of travel. The signal beam VP1 is directed for clockwise (CW) rotation and reference beam VP2 is directed for counter-clockwise (CCW) rotation through fiber waveguide 18. Optical path 20 is coupled between frequency shifter 16 and waveguide 18, and has two birefringent loops 22 therein. Loops 22 function as a fiber waveguide polarizer controller and rotate the vertically polarized beams passing therethrough by 90 degrees, resulting in a horizontal polarized (HP) output beam therefrom. A continuous, unbroken, strand of optic fiber couples the two beams from frequency shifter 16 through loop 18 and back to shifter 16.

The two vertically polarized beams, VP1 and VP2, are frequency shifted by frequency shifter 16 prior to the beams entering the accelerometer sensing fiber waveguide 18. After leaving shifter 16, VP1 enters the controller 22 and is converted to a horizontal polarized wave HP1 prior to entering waveguide 18. VP2 passes through waveguide 18 as a vertically polarized wave and is then converted to a horizontal polarized beam by controller 22. Thus, both incoming waves from coupler 14 to the frequency shifter are vertically polarized, while outgoing waves from the frequency shifter 16 to coupler 14 are horizontally polarized. These two horizontally polarized waves, HP1 and HP2, are also 50—50 split by DC coupler 14 prior to being coupled to and detected by a detector 26. The other half of the split beams travel toward the laser source 2, however, the vertical polarizer 12 effectively blocks the horizontal polarized beams, eliminating a possible noise source.

In the absence of action by the frequency shifter 16, the two beams HP1 and HP2 recombine in the directional coupler 14 and are mixed on the detector 26, forming a central fringe pattern.

Figure 2:
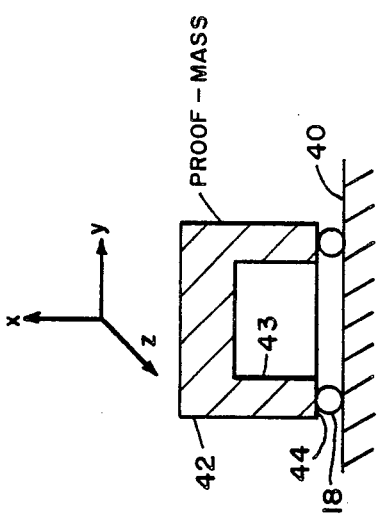
FIG. 2 is a cutaway view of a transducer waveguide element with a proof mass over the element.

As shown in FIG. 2, fiber waveguide 18 is in a plane lying on a suitable support 40. A proof mass 42 is disposed as a a ring or solid body supported on the fiber waveguide 18 loop or ring. The proof mass may be pictured generally as cylindrical cup turned upside down with the wall member 43 having the end 44 thereof supported by the waveguide around the waveguide loop. By applying appropriate stress to the proof mass the optical path length through the loop can be selectively controlled. When sensing waveguide 18 is stressed due to acceleration forces present on a proof mass in a direction, perpendicular to the plane of the waveguide, a change in index of refraction perpendicular to the stress occurs (stress birefringence). This changes the optical path length for the signal beam HP1 but will not change the optical path length for the reference beam VP2 since the vertially polarized wave is unaffected by change perpendicular to the plane. Thus, proof mass 42 provides a means for transferring or applying stress forces present on the proof mass to the fiber waveguide 18. The relative path length of the counterpropagating beams changes in response to stress on the proof mass, resulting in a nonreciprocal phase shift between the beams and consequently an intensity change of the central fringe present on detector 26. This fringe shift corresponding to the case of a stressed waveguide caused by acceleration forces can be defined by the equation:

$$\Delta\phi_A = \Delta\eta_{e-o} L/\lambda \qquad (1)$$

where $$\Delta\eta_{e-o} = BM\Delta a/LW;$$

and $$\Delta\phi_A = BM\Delta a/W\lambda \qquad (2)$$

and

L = length of sensing wavegide 18 that is attached to the proof-mass,
λ = wavelength of laser source 2 in free space,
B = stress-optic coefficient of sensing waveguide 18,
M = weight of proof-mass is grams,
$\Delta a$ = the change in acceleration,
W = the width of the proof-mass attached to the sensing wavegide 18,
$\Delta \eta_{e-o}$ = the change in index of refraction parallel to the direction of stress (ordinary or o-axis) and perpendicular to the direction of stress (extraordinary or e-axis), and
$\Delta \phi_A$ = phase shift between the beams.

In addition to being coupled to the output of detector 8, feedback control circuit 10 is coupled to receive the output of detector 26. A voltage controlled oscillator 28 is driven by the control circuit and provides an alternating current output indicative of the sensed acceleration. This output 30 (compensation frequency Δf) is coupled to monitoring or using circuitry (not shown) and may be coupled directly to or, for example, through an up-down counter 32 to provide a digital frequency output. A dither voltage source 34 is coupled to oscillator 28 for introducing a known dither frequency onto the oscillator output. Dither voltage source 34 provides the dither frequency component to frequency shifter 16 for detector 26 shot-noise operation. The dither frequency may be removed if desired by differential amplifier processing of the output signal (not shown). The output 30 indicates the degree of acceleration present and its direction along the X axis.

In the nulling feedback control circuit 10, the optical detector diode 8 detects a reference signal which indicates the laser output amplitude and phase. Feedback circuit 10 responds to such fluctuation in the laser output to prevent the VCO 28 from acting on such fluctuation as it would on an acceleration signal. Thus, any fluctuation sensed by detector 8 is combined with the output from detector 26 within the control circuit to nullify or otherwise subtract this false amplification signal from the output. Detector 26 mixes the horizontal polarized waves thereon and detects the changes in the resultant interference pattern, if any are present. These signals from detector 26, after combination with the detector 8 output, provide the varying direct current to drive VCO 28. The dither frequency signal output from source 34 is combined in VCO 28 with the detector 26 output signal and establishes the varying frequency to drive frequency shifter 16. The dither frequency is used to dither the fringe pattern detected for detector shot-noise operation of the system.

Frequency shifter 16 responds to Δf and creates a frequency difference between the two beams before the beams enter sensing waveguide 18. The action of the frequency shifter creates a frequency difference 2Δf between beams. This frequency difference is removed when they return through the frequency shifter 16. Thus, there is no frequency difference between the beams when mixed at the detector 26 although they are of different frequencies while counter-propagating through fiber sensing waveguide 18.

The action of the frequency shifter is twofold. By changing the frequency of one counterpropagating beam relative to the other in the sensing waveguide 18 (applying stress), a nonreciprocal phase shift is generated that can be used to nullify the phase shift due to acceleration. The nonreciprocal phase shift also provides a means to produce an oscillatory relative phase shift (optical phase dither) between the counterpropagating beams. These actions allow the electronic AC phase sensitive detection of control circuit 10 via the voltage controlled oscillator 28 and detectors 26 and 8.

The compensation frequency Δf, which is developed by the frequency shifter 16 must be a nonreciprocal frequency change that creates a phase shift $\Delta \phi_F$ between the beams that is equal and opposite to $\Delta \phi_A$ given in Equation 1. This phase shift is given by $$\Delta \phi_F = (\Delta f \eta L)/C \qquad (3)$$

where
Δf = compensation frequency,
η = index of refraction of the sensing waveguide 6,
L = length of the sensing waveguide 6, and
C = the speed of light in free space.

Equating Equations (1) and (2) gives $$\frac{\Delta f}{\Delta a} = \frac{BMf}{\eta L W} \qquad (4)$$

where f is the free space frequency of the laser source 1. For Equation (3) to be valid at any time the condition $\Delta \phi_F = \Delta \phi_A$ must be met. This is accomplished through the use of the difference frequency Δf between the counterpropagating beams. When Δf occurs a change of acceleration signal is developed and fed to voltage controlled oscillator 28. The VCO generates an output that is a relative frequency shift in the HP1 beam. This frequency shift nullifies the phase shift due to acceleration changes. The VCO 28 supplies a digital output via counter 32 as a frequency proportional to a change in acceleration.

The degree of resolution of the system depends on its capability to resolve the central fringe changes and operation near detector shot noise limit. For example, when the fringes are resolved within $10^{-7}$ radians and the operation is shot noise limited, the acceleration resolution can be less than one micro-gravity. Physically, each component of the system can be attached to the proof-mass 42 thus reducing the size and weight of the system.

The system of FIG. 1 represents a bulk-optic and electronic system, wherein individual components are coupled together. The waveguide couplers 6 and 14 and polarizer 12 can be constructed by hand using prisms. The laser source (GaAs) is made of different materials than the fiber waveguides (fused silica). The laser interface with the fiber waveguide is routinely accomplished with fiber optic pigtails (leads).

Figure 3:
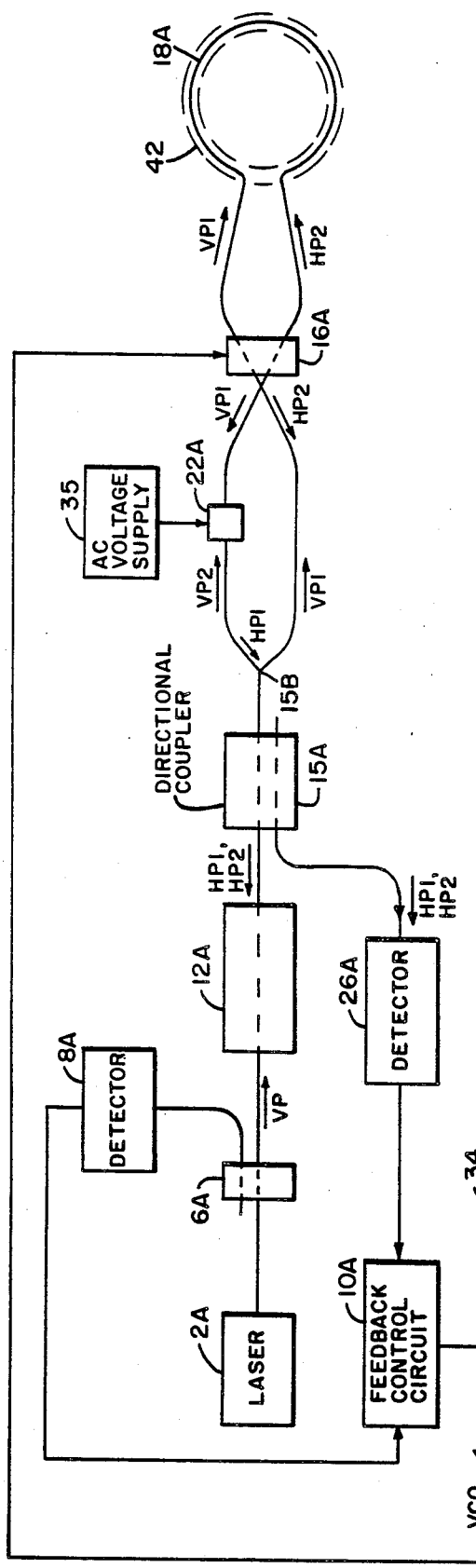
FIG. 3 is an alternative embodiment of the phase detection accelerometer using a planar, monolithic substrate.

To eliminate interface problems such as pigtails it is possible to implement the accelerometer in an integrated optics format as shown in FIG. 3. The system can be a monolithic implementation using gallium arsenide (GaAs) waveguides (18A) and laser diodes (2A) which can be very small construction. It is also possible for the electronics circuitry to be fabricated using GaAs. The waveguide-to-waveguide directional coupler 6A, polarizer 12A, polarizer rotator 22A, and frequency shifter 16A are functionally the same as the elements of corresponding number in FIG. 1 (6, 12, 16, and 22), the only difference being physical. Directional coupler 14 of FIG. 1 is replaced in FIG. 3 by a waveguide-to-waveguide directional coupler 15A and a Y-coupler junction 15B. In FIG. 3 these devices are fabricated within the support substrate (not shown). The system can also be of hybrid construction by using GaAs and lithium-niobate $L_iN_bO_3$) substrates. The laser diode 2A and sensing waveguide 18A can be in a GaAs substrate and the remaining components and waveguides can be $L_iN_bO_3$; or alternatively GaAs diode may be used with the remaining parts being $L_iN_bO_3$. Operation of the integrated optics accelerometer of FIG. 3 is substantially the same as for the fiber optics system of FIG. 1 except that a direct current (d.c.) voltage source 35 drives the polarizer rotator 22A. Directional coupler 15A couples a portion of the horizontally polarized output waves to detector 26A. Y-coupler 15B divides the signal input into the two inputs VP1 and VP2.

Figure 4:
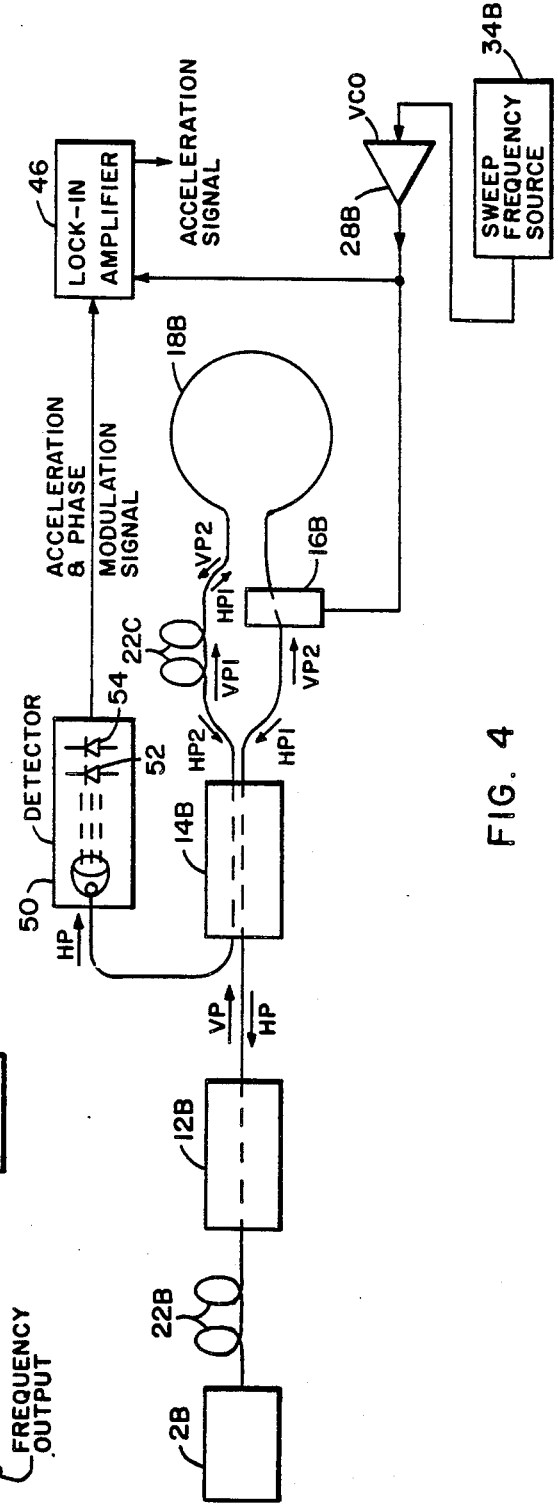
FIG. 4 is an alternative embodiment of the accelerometer ring with open-loop detection.

FIG. 4 shows the optical and electronic circuits used to implement an all fiber continuous strand Sagnac phase detection passive laser accelerometer with no feedback. Again, elements having the same function also have the same number reference, the letter change with the reference is for identification. The linearly polarized laser source 2B generates a beam with intensity I and wavelength λ which travels through the vertical polarizer controller 22B. Controller 22B rotates the polarization of the beam from laser 2B to ensure that maximum power in the vertical direction of polarization enters the vertical polarizer 12B. The vertical polarizer filters out all components of the source beam except the vertical, allowing the highly vertically polarized (VP) light to enter the waveguide-to-waveguide directional coupler 14B. The polarizer 12B also effectively filters all horizontally polarized (HP) components traveling towards light source 2B, thus eliminating a potential noise source. The vertical polarized beam output of coupler 14B is 50—50 split by the coupler, forming two beams VP1 and VP2. The VP1 beam is rotated 90° by a horizontal polarizer controller 22D and becomes horizontally polarized beam HP1 before entering the sensing waveguide 18B. The VP2 beam, rotating counterclockwise, passes through an in-line frequency shifter 16B for phase modulation before entering the sensing waveguide 18B. The proofmass (not shown) is attached to sensing waveguide 18B for stressing the waveguide in proportion to acceleration only in the direction perpendicular to the plane of the waveguide, i.e., the X direction, as noted in detail in FIGS. 1 and 2. The phase, amplitude, and fixed frequency output of the laser is determined by the VCO 28B and is set at a value that will approach detector shot noise limit and operates at the most sensitive phase difference.

The counterpropagating vertical (VP2) and horizontal (HP1) polarized beams are coupled through the sensing waveguide 18B. Subsequently, controller 22C rotates beam VP2 by 90°, forming beam HP2. Thus, both beams enter coupler 14B as horizontal polarized beams and are divided, half of the energy of the respective beams are mixed and detected by the photodetector 50. The remaining half of the split beams travels towards the laser source but is effectively blocked by the vertical polarizer 12B since the beam is polarized in the horizontal direction, eliminating a potential noise source. The two horizontal polarized beams (signal beam HP1 and reference beam HP2) are mixed at the detector 50 forming a central fringe pattern. The fringe pattern is modulated by the effect of modulation 16B on the respective beams. In detector 50 two optical energy detectors 52 and 54 are employed differentially connected. The detectors can be placed 90° spatially apart from a central fringe and on the same side thereof. In the absence of acceleration forces in the X direction (normal to the plane of transducers 18B as shown in FIG. 2) the phase modulated signal developed by the two detectors is fed to a lock-in amplifier 46 where the signal is demodulated and the direct current acceleration signal output is zero. When acceleration in the X direction is present the output is a varying DC. The equation of the demodulated signal output is $$S_o = I_o(1 + \cos\Delta\phi)/2 \tag{5}$$

where
$I_o$ is the intensity at the detectors and $$\Delta\phi = (BM\Delta a)/\lambda W$$

The varying DC signal output is zero when Δa is zero. The use of two detectors provide twice the sensitivity and provides a simple means for determining the direction of acceleration. When acceleration forces occur in the X direction, stress-birefringent action takes place causing index of refraction changes only in the horizontal direction in the fiber 18B and creating a phase difference (Δφ) between the two beams VP2 and HP1. The phase change (Δφ) is detected by the detectors 52 and 54 and, via the lock-in amplifier a signal output proportional to the change in acceleration (Δa) is generated. This implementation can also be implemented in an integrated optics format where the phase modulation is an electro-optic device.

The embodiments of FIGS. 1 and 3 are different only in their physical construction - FIG. 1 being individual components or bulk construction, FIG. 3 being a monolithic, planar, construction. Both embodiments set forth a Sagnac phase detection, passive, laser, accelerometer with a nulling frequency feedback. FIG. 1 uses optical fiber waveguides, FIG. 3 uses integrated optic waveguides. FIG. 4 differs from FIG. 1 only in the lack of feedback, i.e., FIG. 1 teaches a closed-loop accelerometer and can also be implemented using integrating optic waveguides. The optical fiber loops 22 and 22C of FIGS. 1 and 4 project outside of the plane of the respective wavegides. The proof-mass arrangement of FIG. 2 is applicable to all embodiments. Since the counter rotating beams in the transducing waveguide (sensing element) are of proper polarization, any acceleration stress normal to the plane of the sensor produces a change in the output that is indicative of the degree or magnitude and direction of acceleration.

Although specific embodiments of the invention have been shown and described, other embodiments may be obvious to persons skilled in the art, in light of this disclosure. It is therefore to be understood that, within the scope of the appended claims, the invention may be practiced otherwise than as specifically described.

I claim:

1. A phase detection laser accelerometer comprising: a laser for generating a beam of coherent light; a directional coupler having first, second, third, and fourth optical, input-output ports, said first port being coupled to receive said beam of coherent light; optical waveguide means having a refractive index that changes in response to stress, said waveguide means lying substantially in a plane and having first and second adjacently spaced input-output ports coupled to respective second and third input-output ports of said directional coupler for providing a single optical path between the two coupler ports; a polarizer disposed between said laser and said directional coupler first port for vertically polarizing said beam of light; polarization control means disposed in said single optical path neighboring to said path's first input-output port; optical energy detection means coupled to said fourth input-output port of said directional coupler for providing an output signal indicative of acceleration stress forces directed perpendicular to the plane of the waveguide means; stress application means disposed adjacent to said waveguide means for subjecting a portion of said waveguide means optical path to said acceleration stress forces; and modulating means adjacent to said directional coupler and disposed between said directional coupler and said polarization control means for modulating polarized laser light in said optical path.

2. A phase detection laser accelerometer as set forth in claim 1 wherein said polarization control means is disposed for rotating the polarization of light passing therethrough from vertical to horizontal polarization, said waveguide means has a sensing loop portion, and said stress application means is disposed on the surface of the sensing loop portion.

3. A phase detection laser accelerometer as set forth in claim 2 wherein said optical energy detection means comprises at least a photodetector for providing an electrical output in response to optical energy impinging thereon.

4. A phase detection laser accelerometer as set forth in claim 3 and further comprising feedback means coupled to said detection means output and to said modulating means for controllably modulating the phase of the light frequency traveling in said waveguide means optical path.

5. A phase detection laser accelerometer as set forth in claim 4 and further comprising a photodetection means coupled to sample light output from said laser for detecting fluctuations in amplitude and phase of said laser, said photodetection means being further coupled to said feedback means; said detected fluctuation signals and said optical energy detection means output signal being combined in said feedback means for removing amplitude and phase fluctuation signals present in the detected output signal.

6. A phase detection laser accelerometer as set forth in claim 5 wherein said waveguide means is an optical fiber for creating birefringence and said polarization control means comprises plural, adjacent loops in said optical fiber, said fiber loops project outside the plane of the waveguide means to shift the phase of light passing through the optical fiber loops by 90 degrees.

7. A phase detection laser accelerometer as set forth in claim 4 wherein said waveguide means is an integrated optical circuit, and said polarization control means is a phase shifter for rotating the phase of counterpropagating light beams passing therethrough by 90 degrees so that the vertically polarized beams from said vertical polarizer, when divided by said directional coupler, are orthogonally polarized while rotating through said loop portion of the waveguide.

8. A phase detection laser accelerometer as set forth in claim 7 and further comprising a voltage controlled oscillator coupled between said feedback means and said modulating means for driving the modulating means.

9. A phase detection laser accelerometer as set forth in claim 4 and further comprising a lock-in amplifier coupled to said optical energy detection means output; and said modulating means comprises a phase modulator, a voltage controlled oscillator and a signal generator, said phase modulator being coupled between the waveguide means and the oscillator, and said signal generator driving the oscillator; said oscillator further having an output coupled to the lock-in amplifier, said amplifier passing stress acceleration signals.

10. A phase detection laser accelerometer comprising: a laser for generating a beam of coherent light; a waveguide-to-waveguide directional coupler having first and second, optical, input-output ports and a third, output, port; said first input-output port being coupled to receive said beam of coherent light; optical waveguide means having a refractive index that changes in response to stress, said waveguide means lying substantially in a plane and forming an optical path loop terminating in a Y-coupler junction, said Y-coupler junction having an input-output port coupled to said second input-output port of said directional coupler; said waveguide means having a substantially circular loop portion spaced apart from said waveguide means Y-coupler junction; a polarizer disposed between said laser and said directional coupler first port for vertically polarizing said beam of light; polarization control means disposed in said optical path loop; modulating means adjacent to said polarization control means for modulating polarized laser light in said optical path, said polarization control means being disposed between said directional coupler and said modulating means; optical energy detection means coupled to said third, output, port of said directional coupler for providing an output signal indicative of acceleration stress forces directed perpendicular to the plane of the waveguide means; stress application means disposed on the surface of the circular loop portion of said waveguide means for subjecting the loop portion of said waveguide means optical path to said acceleration stress forces; and feedback means coupled to receive the optical energy detection means output and having an output coupled to said modulating means for controllably modulating the phase of the light frequency traveling in said waveguide means and wherein said polarization control means is disposed for rotating the polarization of light passing therethrough from vertical to horizontal polarization.

11. A phase detection laser accelerometer as set forth in claim 10 wherein said optical energy detection means comprises at least a photodetector for providing an electrical output in response to optical energy impinging thereon.

12. A phase detection laser accelerometer as set forth in claim 11 and further comprising a photodetection means coupled to sample light output from said laser for detecting fluctuations in amplitude and phase of said laser, said photodetection means being further coupled to said feedback means.

* * * * *